United States Patent
Britto Mattos Lima et al.

(10) Patent No.: US 10,769,466 B2
(45) Date of Patent: Sep. 8, 2020

(54) PRECISION AWARE DRONE-BASED OBJECT MAPPING BASED ON SPATIAL PATTERN RECOGNITION

(71) Applicant: International Business Machines Corporation, Armonk, NY (US)

(72) Inventors: Andrea Britto Mattos Lima, Sao Paulo (BR); Carlos Henrique Cardonha, Sao Paulo (BR); Matheus Palhares Viana, Paulinia (BR); Maciel Zortea, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 15/899,919

(22) Filed: Feb. 20, 2018

(65) Prior Publication Data

US 2019/0258883 A1    Aug. 22, 2019

(51) Int. Cl.
*G05D 1/04*   (2006.01)
*G06K 9/00*   (2006.01)
(Continued)

(52) U.S. Cl.
CPC ........ *G06K 9/00993* (2013.01); *B64C 39/024* (2013.01); *G05D 1/042* (2013.01);
(Continued)

(58) Field of Classification Search
None
See application file for complete search history.

(56) References Cited

U.S. PATENT DOCUMENTS

| 6,792,363 | B1 | 9/2004 | Bye |
| 7,970,532 | B2 * | 6/2011 | Tehan ................. G05D 1/0646 701/23 |

(Continued)

FOREIGN PATENT DOCUMENTS

| CN | 103839194 A | 6/2014 |
| WO | 2014161945 A1 | 10/2014 |
| WO | 2016110832 A1 | 7/2016 |

OTHER PUBLICATIONS

Laporte, G, et al., "The Selective Travelling Salesman Problem", Discrete Applied Mathematics, Mar. 1990, pp. 193-207, vol. 26, Issues 2-3.

(Continued)

*Primary Examiner* — Jonathan M Dager
(74) *Attorney, Agent, or Firm* — Scully, Scott, Murphy & Presser, P.C.; Joseph Petrokaitis (57) ABSTRACT

An image of a region captured by an unmanned aerial vehicle flying at an altitude may be received. A computer vision algorithm may be executed with the image as an input to compute an overall confidence score associated with detecting one or more candidate objects in the image. Responsive to determining that the confidence score is below a predefined minimum threshold or above a predefined maximum threshold, the unmanned aerial vehicle may be controlled to change its altitude and recapture the image of the region at a new position. Responsive to determining that the overall confidence score is not below the predefined minimum threshold, information associated with the image may be stored on a storage device.

18 Claims, 8 Drawing Sheets

(51) Int. Cl.
*G06K 9/62* (2006.01)
*B64C 39/02* (2006.01)
(52) U.S. Cl.
CPC ....... *G06K 9/00651* (2013.01); *G06K 9/6215* (2013.01); *B64C 2201/127* (2013.01)

(56) References Cited

U.S. PATENT DOCUMENTS

| | | | | |
|---|---|---|---|---|
| 8,527,115 | B2* | 9/2013 | Greenfeld | G01C 11/02 |
| | | | | 382/108 |
| 8,818,572 | B1* | 8/2014 | Tofte | B64C 39/024 |
| | | | | 701/2 |
| 9,019,376 | B2 | 4/2015 | Lee et al. | |
| 9,064,222 | B2* | 6/2015 | Saad | G06Q 10/0631 |
| 9,266,611 | B2 | 2/2016 | Rambo | |
| 9,471,064 | B1* | 10/2016 | Boland | G05D 1/0011 |
| 9,508,263 | B1 | 11/2016 | Teng et al. | |
| 9,618,934 | B2* | 4/2017 | Deroos | G05D 1/0011 |
| 9,715,235 | B2* | 7/2017 | McGrew | G05D 1/0088 |
| 10,068,489 | B2* | 9/2018 | Brown | B64C 39/024 |
| 10,089,716 | B2* | 10/2018 | Chandra | B64C 39/024 |
| 10,192,112 | B2* | 1/2019 | Redden | G06K 9/00657 |
| 10,223,921 | B2* | 3/2019 | Navarro Felix | G08G 5/0034 |
| 10,234,873 | B2* | 3/2019 | Li | B64D 47/08 |
| 10,395,115 | B2* | 8/2019 | Kumar | H04N 13/282 |
| 10,477,756 | B1* | 11/2019 | Richt | A01B 79/005 |
| 10,520,953 | B2* | 12/2019 | Cantrell | G05D 1/104 |
| 10,537,062 | B2* | 1/2020 | Brubaker | H04W 4/70 |
| 10,540,901 | B2* | 1/2020 | Clark | G05D 1/0094 |
| 10,618,673 | B2* | 4/2020 | Chan | G06K 9/6201 |
| 2003/0048357 | A1* | 3/2003 | Kain | G03B 15/006 |
| | | | | 348/144 |
| 2003/0167109 | A1* | 9/2003 | Clarke | G06Q 10/0631 |
| | | | | 701/3 |
| 2005/0021202 | A1* | 1/2005 | Russell | H04B 7/18506 |
| | | | | 348/143 |
| 2005/0197749 | A1* | 9/2005 | Nichols | G05D 1/0027 |
| | | | | 701/3 |
| 2006/0077255 | A1 | 4/2006 | Cheng | |
| 2008/0144884 | A1 | 6/2008 | Habibi | |
| 2009/0157233 | A1* | 6/2009 | Kokkeby | G01S 3/7864 |
| | | | | 701/3 |
| 2010/0286859 | A1* | 11/2010 | Feigh | G08G 5/006 |
| | | | | 701/25 |
| 2012/0050525 | A1 | 3/2012 | Rinner et al. | |
| 2013/0006448 | A1 | 1/2013 | Callou et al. | |
| 2013/0325217 | A1 | 12/2013 | Seydoux et al. | |
| 2014/0316614 | A1 | 10/2014 | Newman | |
| 2014/0316616 | A1* | 10/2014 | Kugelmass | G08G 5/0013 |
| | | | | 701/8 |
| 2015/0254738 | A1* | 9/2015 | Wright, III | G06K 9/00912 |
| | | | | 705/26.81 |
| 2015/0336671 | A1* | 11/2015 | Winn | G05D 1/0094 |
| | | | | 701/3 |
| 2016/0050840 | A1* | 2/2016 | Sauder | G06K 9/00657 |
| | | | | 701/3 |
| 2016/0054733 | A1 | 2/2016 | Hollida et al. | |
| 2016/0068267 | A1 | 3/2016 | Liu et al. | |
| 2016/0116914 | A1 | 4/2016 | Mucci | |
| 2016/0292626 | A1 | 10/2016 | Green et al. | |
| 2016/0299506 | A1 | 10/2016 | Bruggeman et al. | |
| 2016/0307447 | A1 | 10/2016 | Johnson et al. | |
| 2017/0124745 | A1* | 5/2017 | Christ | G01C 11/04 |
| 2017/0146344 | A1* | 5/2017 | Clark | G05D 1/0094 |
| 2017/0162060 | A1 | 6/2017 | Boland et al. | |
| 2017/0334559 | A1* | 11/2017 | Bouffard | G08G 5/0082 |
| 2018/0046187 | A1* | 2/2018 | Martirosyan | B64C 39/024 |
| 2018/0218533 | A1* | 8/2018 | Millin | G05D 1/0094 |
| 2019/0324460 | A1* | 10/2019 | Egner | G06K 9/00771 |

OTHER PUBLICATIONS

Harkins, E., "How to Map Large Areas—DroneDeploy's Blog", Drone Deploy, https://blog.dronedeploy.com/how-to-map-large-areas-6a27d325751, Accessed Dec. 22, 2017, 10 pages.

Mesas-Carrascosa, F.-J., et al., "Assessing Optimal Flight Parameters for Generating Accurate Multispectral Orthomosaicks by UAV to Support Site-Specific Crop Management", Remote Sensing, Published Sep. 29, 2015, pp. 12793-12814, 2015 (7).

Klemas, V.V., "Coastal and Environmental Remote Sensing from Unmanned Aerial Vehicles: An overview", Journal of Coastal Research, Sep. 2015, pp. 1260-1267, 31(5).

Avellar, G.S.C., "Multi-UAV routing for area coverage and remote sensing with minimum time", Sensors 2015, Received Jun. 27, 2015, Published Nov. 2, 2015, pp. 27783-27803, 15 (11).

Di Franco, C., "Coverage Path Planning for UAVs Photogrammetry with Energy and Resolution Constraints", J Intell Robot Syst (2016), Published online Feb. 5, 2016, pp. 445-462, 83.

Di Franco, C., et al., "Energy-Aware Coverage Path Planning of UAVs", 2015 IEEE International Conference on Autonomous Robot Systems and Competitions, Apr. 8-10, 2015, pp. 111-117.

Popovic, M., et al., "Multiresolution Mapping and Informative Path Planning for UAV-based Terrain Monitoring," 2017 IEEE/RSJ International Conference on Intelligent Robots and Systems (IROS), Sep. 24-28, 2017, pp. 1382-1388.

Wikipedia, "Travelling salesman problem", https://en.wikipedia.org/wiki/Travelling_salesman_problem, Last edited on Feb. 19, 2018, Printed on Feb. 20, 2018, 16 pages.

\* cited by examiner

FIG. 11

PRECISION AWARE DRONE-BASED OBJECT MAPPING BASED ON SPATIAL PATTERN RECOGNITION

FIELD

The present application relates generally to computers and drones, and controlling drones in image capturing.

BACKGROUND

There are several applications using drones or unmanned aerial vehicles (UAVs) for capturing images that are later processed by automatic Computer Vision (CV) algorithms. For example, in agriculture, drones can be used for taking photos of plantations, and these images can be subject to algorithms for counting and/or recognizing the detected vegetation. A limit to this process is the reduced battery time of the currently available models of drones. Thus, when capturing aerial images, there is a tradeoff between the drone's autonomy and image quality. For instance, if a user desires to capture a large region of a desired size, the fastest way of doing so may be to take a picture from a very high altitude that is able to capture the entire region. However, the produced photograph may not be suitable for CV algorithms, for example, due to its low spatial resolution. On the other hand, if the drone flies in a very low altitude, it may require several pictures that cannot be taken due to the available battery time.

BRIEF SUMMARY

A method and system of controlling an unmanned aerial vehicle may be provided. The method, in one aspect, may include receiving an image of a region captured by the unmanned aerial vehicle flying at a current altitude. The method may also include executing a computer vision algorithm with the image as an input to the computer vision algorithm. The computer vision algorithm may compute an overall confidence score associated with detecting one or more candidate objects in the image. The method may also include, responsive to determining that the overall confidence score is below a predefined minimum threshold, controlling the unmanned aerial vehicle to reduce the current altitude and recapture the image of the region at the reduced altitude. The method may also include, responsive to determining that the overall confidence score is not below the predefined minimum threshold, storing on a storage device the image, the one or more objects detected in the image, the confidence score, location coordinates of the unmanned aerial vehicle, and the current altitude. The method may further include repeating the receiving, the executing, the triggering and the storing while the region is not fully mapped with images and the unmanned aerial vehicle has energy capacity above a level needed to return to a designated base location.

A system of controlling an unmanned aerial vehicle, in one aspect, may include at least one hardware processor coupled to an unmanned aerial vehicle and a storage device coupled to the at least one hardware processor. The at least one hardware processor may be operable to perform receiving an image of a region captured by the unmanned aerial vehicle flying at a current altitude. The at least one hardware processor may be further operable to perform executing a computer vision algorithm with the image as an input to the computer vision algorithm, the computer vision algorithm computing an overall confidence score associated with detecting a one or more candidate objects in the image. The at least one hardware processor may be further operable to perform, responsive to determining that the overall confidence score is below a predefined minimum threshold, controlling the unmanned aerial vehicle to reduce the current altitude and recapture the image of the region at the reduced altitude. The at least one hardware processor may be further operable to perform, responsive to determining that the overall confidence score is not below the predefined minimum threshold, storing on a storage device the image, the object detected in the image, the confidence score, location coordinates of the unmanned aerial vehicle, and the current altitude. The at least one hardware processor may be further operable to repeat the receiving, the executing, the triggering and the storing while the region is not fully mapped with images and the unmanned aerial vehicle has energy capacity above a level needed to return to a designated base location.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and techniques may be presented that optimize a process of taking aerial pictures of a region by an unmanned aerial vehicle (also referred to as a drone) by considering both the drone's autonomy and image quality. The system and method of the present disclosure may allow computer vision (CV) algorithms to be processed in real time, and based on the confidence scores of the algorithms adapt the drone's altitude, for example, for the next photos. To accelerate or speed up the image recognition process and make it suitable for real-time execution in drones, the system and/or method of the present disclosure in some embodiments explore the identification of spatial patterns followed by the objects of interest, e.g., explore the fact that all objects will be distributed in parallel lines. For instance, the system and/or method may compute optimal altitude and/or path for capturing the images. Confidence scores may be used for optimizing a process of recapturing pictures of regions with lower confidence.

The system and/or method in some embodiments improve the accuracy of object recognition by adjusting the altitude of drones in real-time and by exploring spatial patterns. Spatial patterns are considered to increase the efficiency of the CV algorithms (e.g., facilitate and/or speed up the execution of image recognition algorithms) and the altitude of the drones are adjusted according to the image quality. The system and/or method in some embodiments may perform an optimization procedure to determine captured image's precision and recapture the images (take images again) if the precision does not meet a criterion, for example, a quality threshold. Real-time adjustments on drones' altitudes are supported by an efficient image processing algorithm that can be quickly executed by drones. The system and/or method in some embodiments use images or image information for adjusting automatically the optimal altitude, e.g., control altitude according to the camera input.

The system and/or method also may improve the accuracy of image processing-based solutions that try to identify objects in images captured by drones. For instance, the system and/or method identify spatial patterns described by the objects (e.g., lines) in order to facilitate the recognition of objects and adjust the altitude of drones in real-time based on the quality of the images and/or a confidence level with which image recognition algorithms are identifying the objects, which have been captured more recently.

Figure 1:
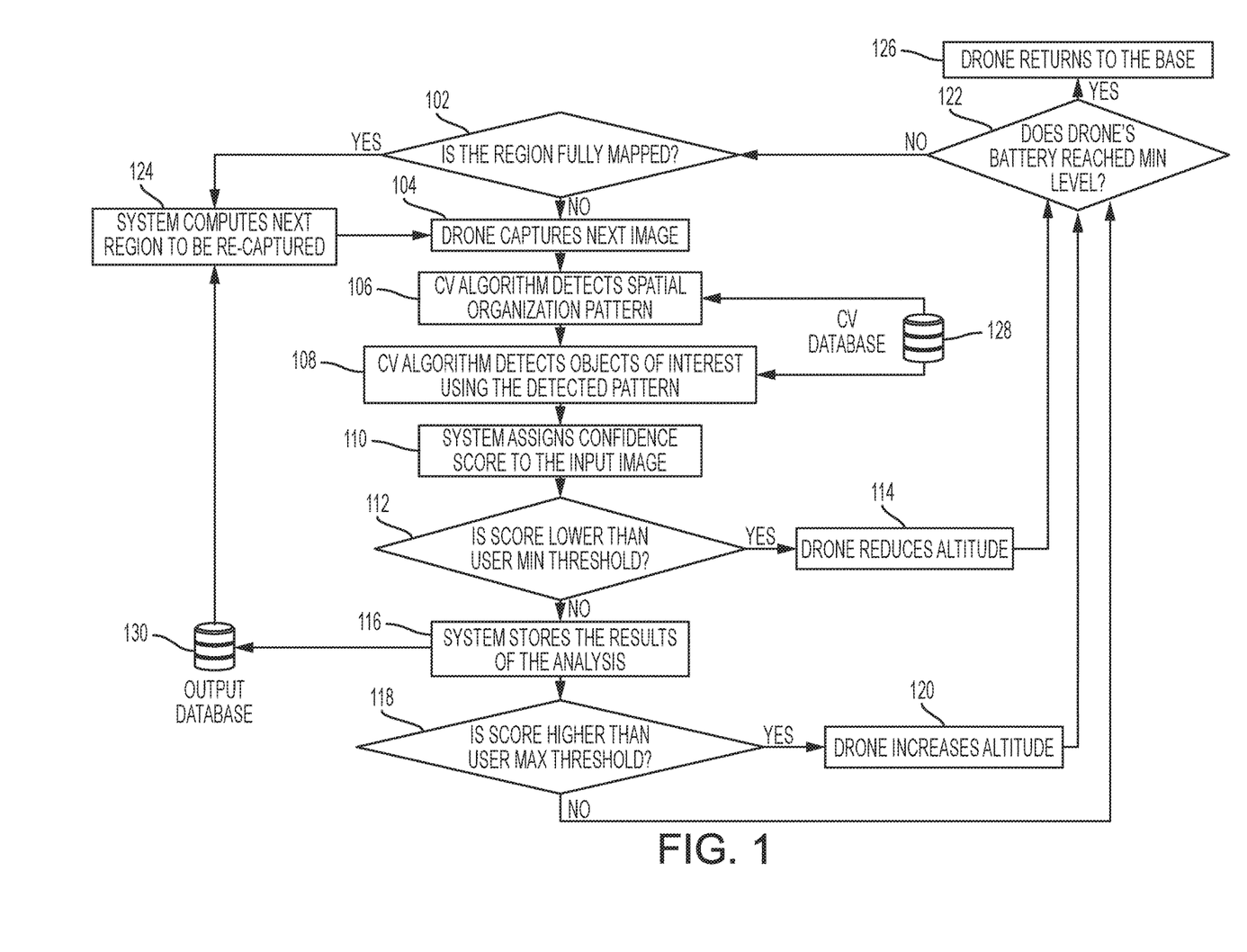
FIG. 1 is a flow diagram illustrating a drone-based image capturing method in one embodiment.

FIG. 1 is a flow diagram illustrating a drone-based image capturing method in one embodiment. The method, in one aspect, may be executed on or by at least one hardware processor coupled to a drone and controlling the drone. For instance, at least one hardware processor may be locally coupled with a drone. In another example, at least one hardware processor may be located remotely from the drone and controlling the drone from a remote location via a communications medium such as wireless communications.

Figure 2:
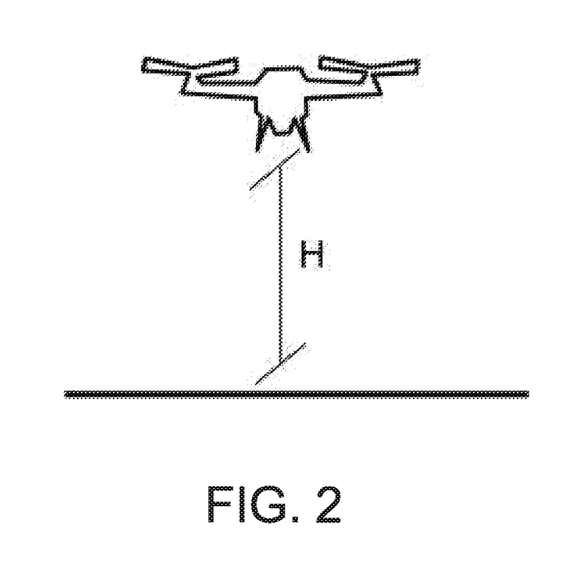
FIG. 2 illustrates a drone flying with distance H from the ground in one embodiment.

A drone takes one or more pictures in order to map a region previously defined by the user. For instance, FIG. 2 illustrates a drone flying with distance H from the ground in one embodiment. The drone may capture images while the region is not fully mapped, e.g., all the areas of region are captured by one or more images or pictures taken by the drone. Referring to FIG. 1, at 102, it is determined whether the region is fully mapped. If the region is not fully mapped, the logic of the method proceeds to 104. If the region is fully mapped, the logic of the method proceeds to 124.

Figure 3:
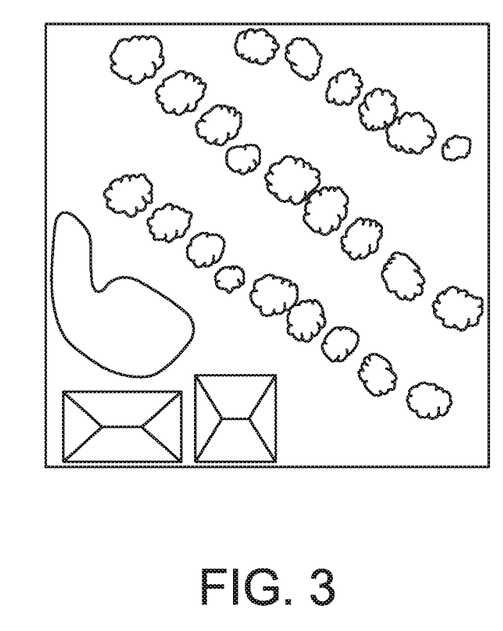
FIG. 3 illustrates an input image captured at altitude H by a drone in one embodiment.

At 104, the drone captures an image that serves as input to a CV algorithm that will try to detect one or more candidate objects in the image. Example algorithms for object detection may include, but are not limited to, cascade classifiers (e.g., based on Haar features) and deep learning-based methods such as methods using on deep convolutional neural networks (e.g., you only look once (YOLO) real-time object detection, Faster Region-based Convolutional Neural Network (Faster R-CNN) real-time object detection). For example, FIG. 3 illustrates an input image captured at altitude H by a drone in one embodiment.

Referring to FIG. 1, at 106, the CV algorithm first processes the image in order to detect spatial organization patterns. Examples of a spatial organization pattern may include a known pattern of an object or area, e.g., plantation pattern, or another object pattern. Example methods for this task may include methods that detect, in an image, user-defined patterns such as geometric shapes including one or more of lines, ellipses, and squares. Examples of method may include, but are not limited to, the Hough transform, for detecting lines and polygons, and or Circular Hough transform, for detecting circles and ellipses. An algorithm may be selected from a database with the computer vision algorithms 128 for detecting spatial organization patterns and the objects of interest and executed.

At 108, the CV algorithm uses the pattern information for optimizing the image analysis in order to locate the objects of interest. This step may use neuromorphic chips to perform several convolutions in parallel.

Figure 4:
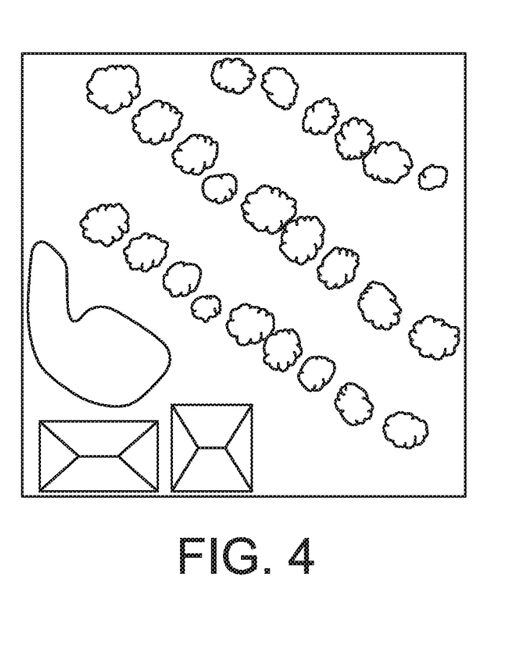
FIG. 4 illustrates pattern inference delimiting regions of interests (ROIs) for object detection in one embodiment.
Figure 5:
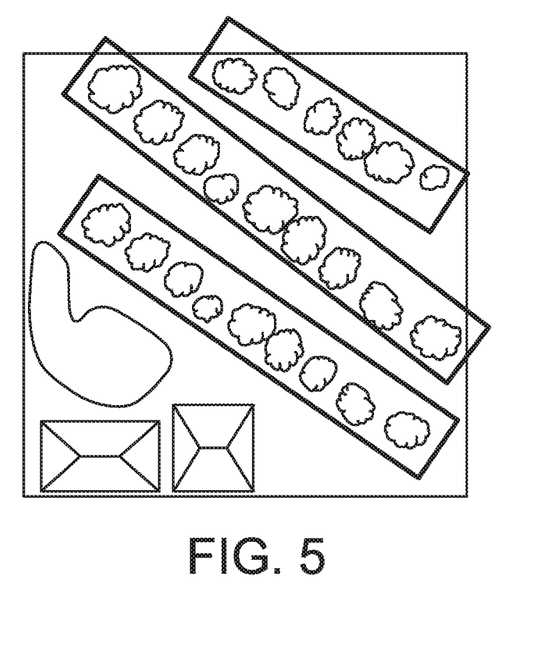
FIG. 5 illustrates that objects are detected inside ROIs in one embodiment. In one aspect, there may be no need to search at regions outside ROI.
Figure 6:
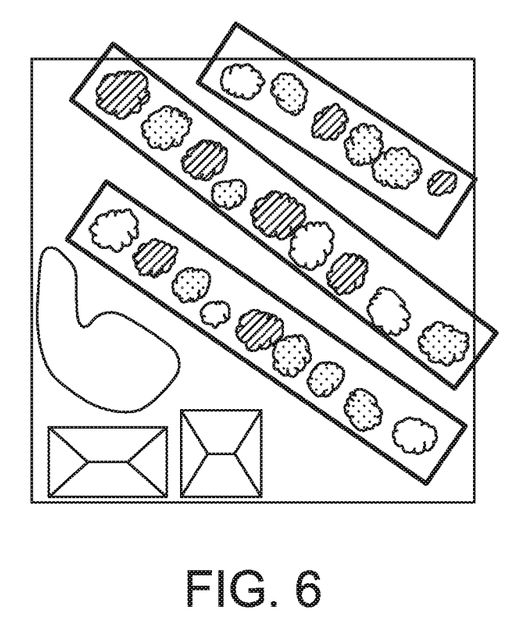
FIG. 6 illustrates objects detected with confidence scores in one embodiment.

For example, FIG. 4 illustrates pattern inference delimiting regions of interests (ROIs) for object detection in one embodiment. FIG. 5 illustrates that objects are detected inside ROIs in one embodiment. In one aspect, there may be no need to search at regions outside ROI. FIG. 6 illustrates objects detected with confidence scores in one embodiment. For instance, objects are detected with confidence scores (e.g., shown in FIG. 6 with stripes representing high confidence, dots representing low confidence, and blank objects are not detected). According to the individual scores, the hardware processor executing the method in one embodiment of the present disclosure may assign overall confidence score C to the image. Then, C is compared with a threshold, for example, user-defined minimum score T.

Referring to FIG. 1, at t 110, based on the individual confidence of each detected candidate, the hardware processor executing the method computes overall confidence score C_i of the object detection algorithm for the input image i. The overall confidence score C_i indicates how well the algorithm is performing at the input image based on the individual confidence scores. The individual confidence scores reflect how confident the model is that each selected bounding box contains indeed one candidate object. The overall confidence score C_i of input image i may be given by the average of the confidence scores of all candidate objects that have been detected, e.g., by the minimum confidence score or the geometric mean. Other consolidation metrics may be used to evaluate C_i.

Threshold values, minimum threshold value ($T_{min}$) and maximum threshold value ($T_{max}$), which may be preconfigured or predefined may be retrieved. At 112, it is determined whether the confidence score is too low (considering a minimum value previously defined by the user), which is an indication that the object detection is not satisfactory. For instance, the confidence score is compared to a defined minimum threshold value.

Figure 7:
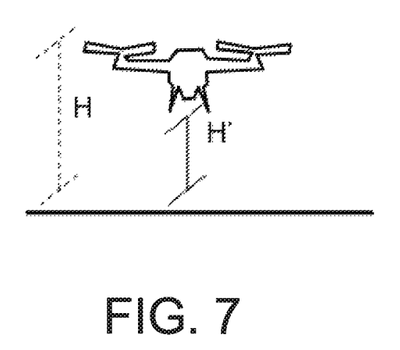
FIG. 7 shows an example of new input image captured by a drone flying at changed position in one embodiment.
Figure 8:
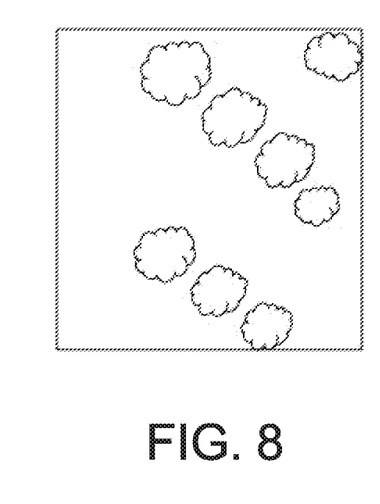
FIG. 8 shows an example of new input image captured by a drone flying at altitude H' in one embodiment.

At 114, responsive to determining that the confidence score is below the minimum threshold value, the drone changes its position, e.g., reduces its altitude, in order to take pictures that are able to capture more detailed features of the area of interest. Procedures to determine how much the drone should reduce its altitude by may include, but are not limited to: 1) retrieving a predefined or preconfigured (e.g., by a user) reduction factor or rule and proceeding according to the reduction factor or rule (e.g., a reduction factor or rule may specify the drone to decrease altitude by X amount (e.g., 2 meters) until the threshold condition is satisfied); (2) using historical data to compute the reduction factor (e.g., historical data may include previously stored confidences scores and associated altitude of the unmanned aerial vehicle, and an altitude associated with confidence score above the minimum threshold value may be adapted for changing the current position). In one aspect, the worse the confidence score, the lower the drone should fly. For instance, FIG. 7 illustrates a drone changing its flying altitude. For instance, if C<T, the drone decreases altitude, from H to H' as shown at FIG. 7. New input is captured at this changed position, e.g., altitude H'. FIG. 8 shows an example of new input image captured by a drone flying at altitude H' in one embodiment.

Referring to FIG. 1, the logic of the method proceeds to 122 from 114.

At 116, responsive to determining that the confidence score is not below the minimum threshold value (the object detection is satisfactory), the hardware processor executing the method stores the results of the analysis. The results of the analysis, for example, include the image, the detected objects, the confidence score, the drone's coordinates, and the drone's altitude. The results, for example, may be stored on a storage device 130, which stores a database of such outputs. The storage device 130, for example, stores the output database with the captured images and its properties, which may be used later for additional tasks such as building image mosaics.

At 118, the hardware processor executing the method may check whether the confidence score is too high (e.g., above a maximum value previously defined by the user or a configured maximum threshold value). Such confidence score represents that the object detection is excellent and that the image quality would not be largely affected even if the drone flies higher.

At 120, if it is determined that the confidence score is above a maximum threshold value, the drone increases altitude. The higher the confidence score, the higher the drone may fly. A procedure to determine how much the drone should increase its altitude by may include, but is not limited to, retrieving a predefined increment, which may have been defined by a user or preconfigured previously, to determine the amount of altitude to increase. Another example of a procedure in determining how much the drone should increase its altitude by may include, but is not limited to, using historical data to compute the increment (e.g., historical data may include previously stored confidences scores and associated altitude of the unmanned aerial vehicle, and an altitude associated with confidence score below the maximum threshold value may be adapted for changing the current position). The logic of the method proceeds to 122

After the processing at 114 or 120, the logic of the method may proceed to 122. At 122, the hardware processor executing the method may check whether the drone's battery reached the minimum level, for example, minimum energy required for the drone to return to its base.

Responsive to determining that the battery has sufficient charge or energy, the logic of the method returns to 102. At 102, it is determined whether the area is fully mapped. If the area is fully mapped, at 124, the hardware processor executing the method may compute an optimized route for revisiting the regions with lower confidence scores, capturing images with higher resolution by reducing the route altitude, for example.

At 126, responsive to determining that the drone's battery reached the minimum level, the drone is directed or triggered to return to its base.

The hardware processor controls the drone such that the drone captures the next image while the region is not fully mapped or there is sufficient battery capacity. If the area is fully mapped but there is still remaining battery time, the hardware processor may compute an optimized route for the drone to revisit the regions with lower confidence scores and re-capture images with higher resolution, e.g., capture images again at a lower altitude.

An optimization algorithm as follows may be performed at 124. Given a threshold for confidence scores, the hardware processor executing the method may, e.g., in polynomial time, identify all images in a region that need to be captured again, for example, one or more images that did not meet the threshold. For instance, in an example scenario, consider without loss of generality that there are 4 images to be captured for each unsatisfactory image (e.g., the region of that image is divided in 4 regions, which need to be captured separately). Given this data, two scenarios may be considered:

All unsatisfactory images need to be recaptured. In this case, the hardware processor executing the method may select a route that minimizes the distance traversed by the drone in capturing all the unsatisfactory images that need to be recaptured. A solution similar to solving the Travelling Salesman Problem, for which several exact and approximate algorithms are known in the literature, may be employed in this scenario.

If battery limitations need to be considered, the problem can be formulated and solved as the Selective Travelling Salesman Problem, in which one wishes to maximize the profit while respecting a maximum length that can be traversed.

Figure 9:
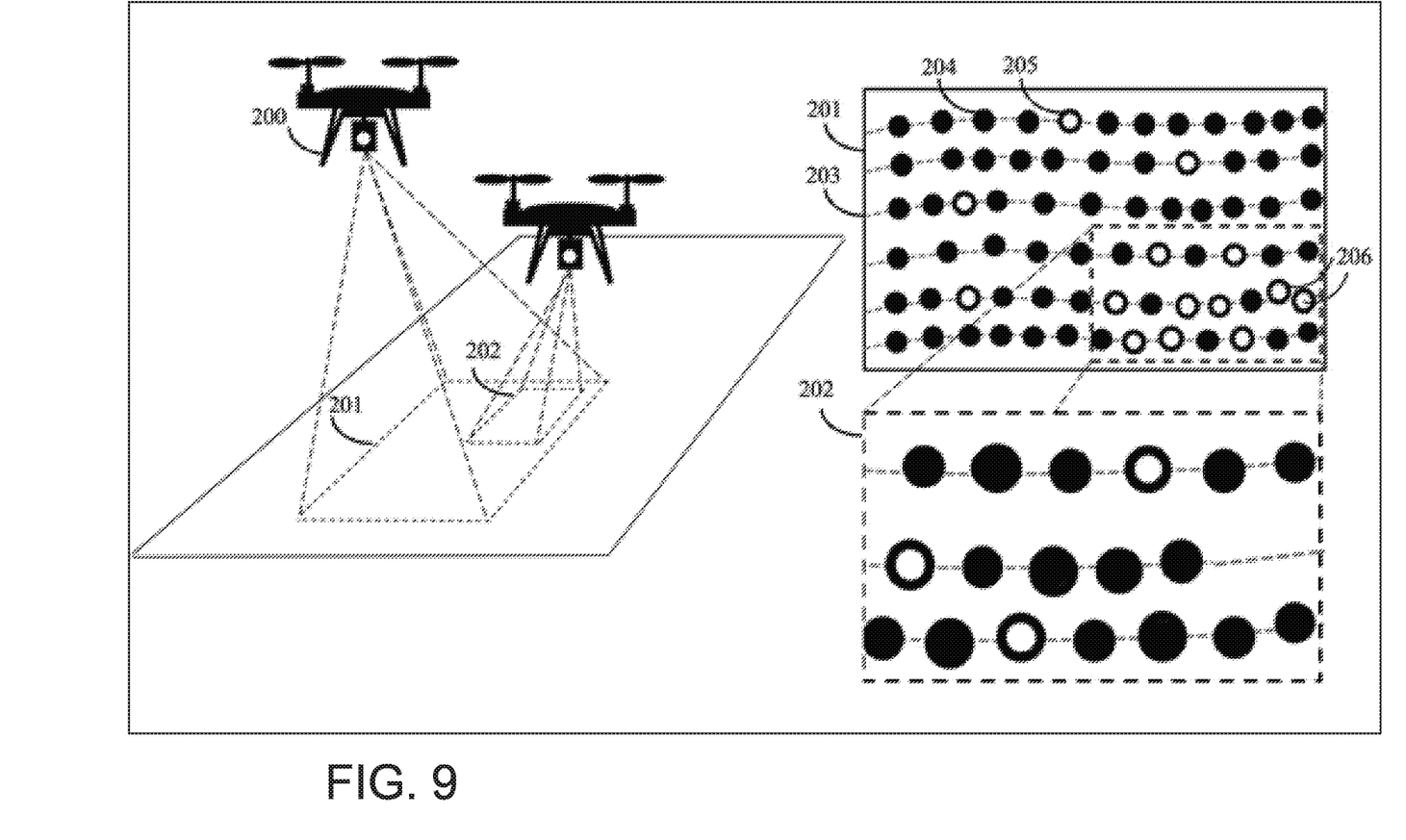
FIG. 9 illustrates a drone taking images and changing its position based on captured image quality, in one embodiment.

FIG. 9 illustrates a drone taking images and changing its position based on captured image quality, in one embodiment. A drone 200 shown in FIG. 9 flying at an altitude acquires a digital image 201 that is processed using one or more CV algorithms to detect image objects of interest in the scene. In the example shown in FIG. 9, the objects of interest are aligned in a preferential direction 203. The (curvilinear) alignment is detected by a CV algorithm and taken into account when processing the acquired image, for instance, to eliminate surrounding areas that are unlikely to contain the objects of interest and, therefore, have a low priority for on-board processing, saving computation power. The resulting (aligned) candidate detections in the input image are classified using a CV algorithm that assigns a level of confidence to an individual detection. In the illustration shown in FIG. 9, the detected objects, marked with black circles 204, were classified with a high level of confidence, e.g., above a probability threshold that was set a priori by the user (e.g., 70%), whereas detections with lower confidence are indicated with open circles 205. At this point, after analyzing the relevant areas in the input image, the CV algorithm realizes that there is a cluster of candidate objects detected with low confidence and are located at lower right part of the image 202. The algorithm is not sufficiently certain to either accept or reject the detections in 202 using solely the input image. Therefore, it instructs the drone to lower its current flying altitude, position itself over the relevant location area, and acquire an additional image 202 over that uncertain region. At lower altitude, the spatial resolution of the image can be greatly improved. Therefore, the scene can be inspected in greater detail by the automated CV algorithm. The CV algorithm runs again in the new captured image and now is able to confirm that most of the previously detected objects were indeed relevant detections (above a predefined probability thresholds) and finds that two detections 206 were indeed false alarms because its estimated probabilities in the new analyzed image were too low (lower than a predefined minimum threshold for accepting detections). In the above scenario, because of the variable flying altitude, it was possible to focus, on real time, on the most relevant area(s) to acquire an additional image, and because of the improved spatial resolution of the pixels in the resulting image, the detections of the CV algorithm were more certain (precise).

In one aspect, the method and system may lead to economic benefits to the users, for instance, in the forestry industry improving the estimate number of trees in the stands (the tree census is part of the costly forest inventory) gives a better estimate of the expected volume of wood for harvest for pulp or wood production. For instance, the circular objects shown in FIG. 9 may represent the tree crowns.

Figure 10:
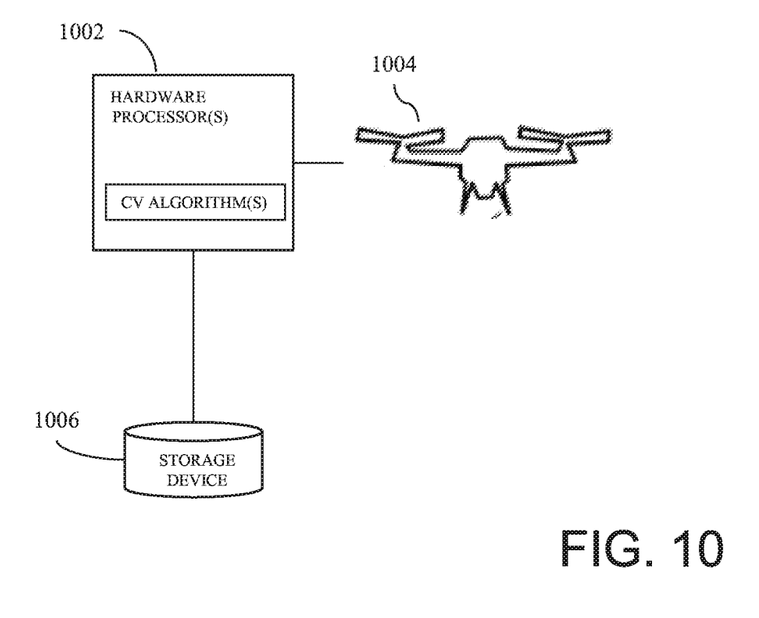
FIG. 10 is a diagram illustrating components of a system that controls an unmanned aerial vehicle in one embodiment.

FIG. 10 is a diagram illustrating components of a system that controls an unmanned aerial vehicle in one embodiment. At least one hardware processor 1002 may be coupled to an unmanned aerial vehicle (drone) 1004 and controls the flight of the drone and/or its functions, for instance, controls the drone to capture images at locations. The hardware processor 1002 may be coupled to a storage device 1006, for example, locally or remotely. The hardware processor 1002, for instance, may control the drone's flight path and direct the drone to take images. In one aspect, at least one hardware processor 1002 may be locally coupled with a drone, for instance, embedded within the drone. In another aspect, at least one hardware processor 1002 may be located remotely from the drone 1004 and control the drone 1004 from a remote location via a communications medium such as wireless communications. The drone 1004 may include a camera and/or other sensors, and may take photographs or images, for instance, of areas over which the drone flies.

The hardware processor 1002, for example, may receive an image of a region captured by the unmanned aerial vehicle flying at an altitude (referred to as a current altitude). The hardware processor 1002 may execute a computer vision algorithm with the image as an input to the computer vision algorithm. The computer vision algorithm may compute a confidence score associated with detecting a candidate object in the image. For instance, the computer vision algorithm may process the image in real-time to detect spatial organization patterns in the image, and locate one or more candidate objects in the image based on the spatial organization patterns. The confidence score may represent an aggregated confidence score associated with detecting each of one or more candidate objects. As an example, the computer vision algorithm may include Hough transform and/or Circular Hough transform.

Responsive to determining that the confidence score is below a defined minimum threshold, the hardware processor 1002 controls the unmanned aerial vehicle to change its flight position, for example, reduce the current altitude such that the drone 1004 is flying at a lower altitude than the current altitude, and recapture the image of the region at the changed flight position, for example, the reduced altitude.

Responsive to determining that the confidence score is not below the defined minimum threshold, the hardware processor 1002 may store on a storage device 1006 data associated with the captured image, for example, the image, the object detected in the image, the confidence score, location coordinates of the unmanned aerial vehicle, and the current altitude.

The hardware processor 1002 may also determine whether the confidence score is above a defined maximum threshold and responsive to determining that the confidence score is above a defined maximum threshold, control the unmanned aerial vehicle or drone 1004 to change its position such that the current altitude is increased, for example, the drone 1004 flies at higher altitude, for instance, for capturing next set of images.

The drone 1004 may continue to take another image of the region and the hardware processor 1002 repeats receiving the image taken by the drone 1004, executing the computer vision algorithm and controlling the flight path of the drone 1004, storing image data on the storage device 1006, for example, while the region is not fully mapped with images and the unmanned aerial vehicle 1004 has energy capacity above a level needed to return to a designated base location. For instance, the hardware processor 1002 and the drone 1004 repeats its functions until the region is fully mapped with images or the drone 1004 does not have sufficient energy for further flights for taking photographs.

In another aspect, responsive to determining that the region is fully mapped with images, but the unmanned aerial vehicle has energy capacity above the level needed to return to the designated base location, the hardware processor 1002 may compute an optimized route for the unmanned aerial vehicle to revisit the region to recapture images at higher resolution. In one embodiment, the hardware processor 1002 may rank regions (areas of the region) based on their associated confidence levels (lower confidence levels leading to higher rank positions) and compute an optimal tour that visits the top k regions again; if the drone's power or battery capacity is not sufficient to traverse the complete tour, k is reduced; otherwise, k is increased. Binary search may be used to identify an optimal value of k, and an identification of each tour may be performed by solving a problem equivalent to the Travelling Salesman Problem.

Figure 11:
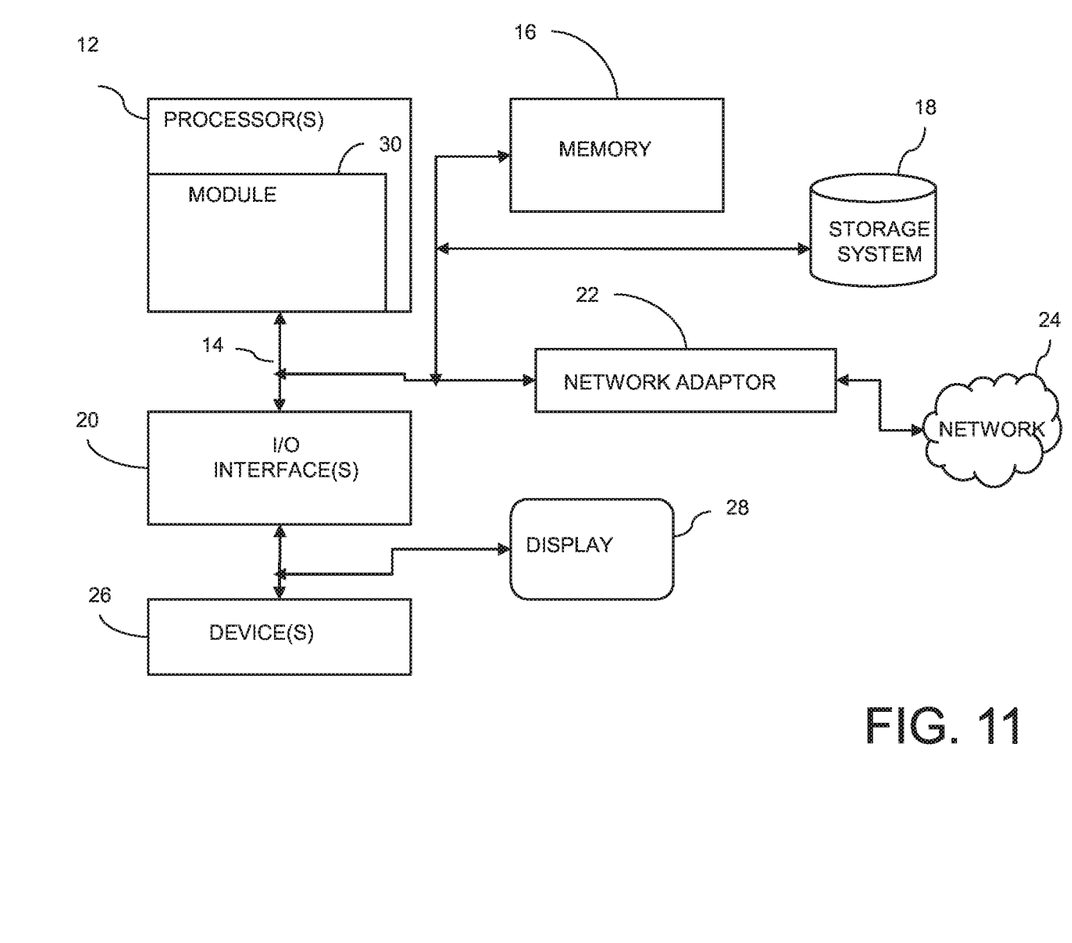
FIG. 11 illustrates a schematic of an example computer or processing system that may implement a system in one embodiment of the present disclosure.

FIG. 11 illustrates a schematic of an example computer or processing system that may implement a system that controls an unmanned aerial vehicle in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of controlling an unmanned aerial vehicle, the method executed by at least one hardware processor coupled to the unmanned aerial vehicle and a storage device, the method comprising:

receiving an image of a region captured by the unmanned aerial vehicle flying at a current altitude;

executing a computer vision algorithm with the image as an input to the computer vision algorithm, the computer vision algorithm computing an overall confidence score associated with detecting one or more candidate objects in the image;

responsive to determining that the overall confidence score is below a predefined minimum threshold, controlling the unmanned aerial vehicle to reduce the current altitude and recapture the image of the region at the reduced altitude;

responsive to determining that the overall confidence score is not below the predefined minimum threshold, storing on a storage device the image, the one or more objects detected in the image, the confidence score, location coordinates of the unmanned aerial vehicle, and the current altitude;

repeating the receiving, the executing, the triggering and the storing while the region is not fully mapped with images and the unmanned aerial vehicle has energy capacity above a level needed to return to a designated base location.

2. The method of claim 1, further comprising:

responsive to determining that the overall confidence score is above a predefined maximum threshold, controlling the unmanned aerial vehicle to increase the current altitude.

3. The method of claim 1, wherein responsive to determining that the region is fully mapped with images, but the unmanned aerial vehicle has energy capacity above the level needed to return to the designated base location, computing a route for the unmanned aerial vehicle to revisit the region to recapture images at higher resolution.

4. The method of claim 1, wherein the computer vision algorithm processes the image in real-time to detect spatial organization patterns in the image, and locates the one or more candidate objects in the image based on the spatial organization patterns.

5. The method of claim 1, wherein the computer vision algorithm detects a plurality of candidate objects in the image and the overall confidence score represents an aggregated confidence score associated with detecting the plurality of candidate objects.

6. The method of claim 1, wherein the computer vision algorithm comprises detecting in the image, user-defined patterns comprising geometric shapes comprising at least one of lines, ellipses, and squares.

7. A computer readable storage medium storing a program of instructions executable by a machine to perform a method of controlling an unmanned aerial vehicle, the method comprising:

receiving an image of a region captured by the unmanned aerial vehicle flying at a current altitude;

executing a computer vision algorithm with the image as an input to the computer vision algorithm, the computer vision algorithm computing an overall confidence score associated with detecting one or more candidate objects in the image;

responsive to determining that the overall confidence score is below a predefined minimum threshold, controlling the unmanned aerial vehicle to reduce the current altitude and recapture the image of the region at the reduced altitude;

responsive to determining that the overall confidence score is not below the predefined minimum threshold, storing on a storage device the image, the object detected in the image, the confidence score, location coordinates of the unmanned aerial vehicle, and the current altitude;

repeating the receiving, the executing, the triggering and the storing while the region is not fully mapped with images and the unmanned aerial vehicle has energy capacity above a level needed to return to a designated base location.

8. The computer readable storage medium of claim 7, further comprising:

responsive to determining that the overall confidence score is above a predefined maximum threshold, controlling the unmanned aerial vehicle to increase the current altitude.

9. The computer readable storage medium of claim 7, wherein responsive to determining that the region is fully mapped with images, but the unmanned aerial vehicle has energy capacity above the level needed to return to the designated base location, computing a route for the unmanned aerial vehicle to revisit the region to recapture images at higher resolution.

10. The computer readable storage medium of claim 7, wherein the computer vision algorithm processes the image in real-time to detect spatial organization patterns in the image, and locates the candidate object in the image based on the spatial organization patterns.

11. The computer readable storage medium of claim 7, wherein the computer vision algorithm detects a plurality of candidate objects in the image and the overall confidence score represents an aggregated confidence score associated with detecting the plurality of candidate objects.

12. The computer readable storage medium of claim 7, wherein the computer vision algorithm comprises detecting in the image, user-defined patterns comprising geometric shapes comprising at least one of lines, ellipses, and squares.

13. A system of controlling an unmanned aerial vehicle, comprising:

at least one hardware processor coupled to an unmanned aerial vehicle; and a storage device coupled to the at least one hardware processor;

the at least one hardware processor operable to perform:

receiving an image of a region captured by the unmanned aerial vehicle flying at a current altitude;

executing a computer vision algorithm with the image as an input to the computer vision algorithm, the computer vision algorithm computing an overall confidence score associated with detecting one or more candidate objects in the image;

responsive to determining that the overall confidence score is below a predefined minimum threshold, controlling the unmanned aerial vehicle to reduce the current altitude and recapture the image of the region at the reduced altitude;

responsive to determining that the overall confidence score is not below the predefined minimum threshold, storing on a storage device the image, the object detected in the image, the confidence score, location coordinates of the unmanned aerial vehicle, and the current altitude;

repeating the receiving, the executing, the triggering and the storing while the region is not fully mapped with images and the unmanned aerial vehicle has energy capacity above a level needed to return to a designated base location.

14. The system of claim 13, wherein the hardware processor is further operable to, responsive to determining that the overall confidence score is above a predefined maximum threshold, control the unmanned aerial vehicle to increase the current altitude.

15. The system of claim 13, wherein the hardware processor is further operable to, responsive to determining that the region is fully mapped with images, but the unmanned aerial vehicle has energy capacity above the level needed to return to the designated base location, compute a route for the unmanned aerial vehicle to revisit the region to recapture images at higher resolution.

16. The system of claim 13, wherein the computer vision algorithm processes the image in real-time to detect spatial organization patterns in the image, and locates the one or more candidate objects in the image based on the spatial organization patterns.

17. The system of claim 13, wherein the computer vision algorithm detects a plurality of candidate objects in the image and the overall confidence score represents an aggregated confidence score associated with detecting the plurality of candidate objects.

18. The system of claim 13, wherein the computer vision algorithm comprises detecting in the image, user-defined patterns comprising geometric shapes comprising at least one of lines, ellipses, and squares.

* * * * *